US009920859B2

(12) United States Patent
Perrigo et al.

(10) Patent No.: US 9,920,859 B2
(45) Date of Patent: Mar. 20, 2018

(54) ELECTROMAGNETIC EFFECTS-SENSITIVE PASS-THROUGH MOUNTING ASSEMBLIES WITH ADJUSTABLE OFFSET

(71) Applicant: The Boeing Company, Huntington Beach, CA (US)

(72) Inventors: Gregory Dale Perrigo, Woodinville, WA (US); Richard Kevin Johnson, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 14/733,626

(22) Filed: Jun. 8, 2015

(65) Prior Publication Data

US 2016/0356403 A1    Dec. 8, 2016

(51) Int. Cl.
*F16L 5/00* (2006.01)
*B64D 37/00* (2006.01)
(Continued)

(52) U.S. Cl.
CPC .............. *F16L 5/00* (2013.01); *B64D 37/00* (2013.01); *B64D 37/005* (2013.01); *B64D 37/32* (2013.01);
(Continued)

(58) Field of Classification Search
CPC ..... F16L 5/00; F16L 5/025; F16L 5/10; F16L 25/01; F16L 25/02; B64D 37/00;
(Continued)

(56) References Cited

U.S. PATENT DOCUMENTS 2,813,692 A * 11/1957 Peterson ............... H01L 17/306
                                            174/152 R
4,315,586 A    2/1982 Dolamore
(Continued)

FOREIGN PATENT DOCUMENTS

| CA | 1309576 | 11/1992 | |
|---|---|---|---|
| DE | 2528051 A1 * | 1/1977 | ............... F16L 5/02 |
| DE | 3207420 | 9/1983 | |

OTHER PUBLICATIONS

Machine generated English translation of the abstract of DE 3207420, downloaded from espacenet.com on May 29, 2015.

*Primary Examiner* — Jonathan Liu
*Assistant Examiner* — Guang H Guan
(74) *Attorney, Agent, or Firm* — Dascenzo Intellectual Property Law, P.C.

(57) ABSTRACT

Pass-through mounting assemblies include an outer sleeve, an inner sleeve, a bushing component, and a cap that are configured to be assembled onto a partition aperture in a partition to retain a tube as the tube passes through the partition. The outer sleeve is sized to fit into the partition aperture. The inner sleeve is sized to nest into the outer sleeve and includes a non-concentric inner rim. The bushing component defines a tube aperture configured to retain the tube and includes an outer rim sized to nest into the inner rim of the inner sleeve. The tube aperture is non-concentric with the outer rim of the bushing component. The cap includes an inner rim sized to nest over the outer rim of the inner sleeve. The tube aperture position may be adjusted by changing the relative angular position of the bushing component, the inner sleeve, and the cap.

17 Claims, 6 Drawing Sheets

(51) Int. Cl.
  *B64D 37/32* (2006.01)
  *B64D 45/02* (2006.01)
  *F16L 5/02* (2006.01)
  *F16L 25/01* (2006.01)
  *F16L 5/10* (2006.01)
  *F16L 25/02* (2006.01)

(52) U.S. Cl.
  CPC .............. *B64D 45/02* (2013.01); *F16L 5/025* (2013.01); *F16L 5/10* (2013.01); *F16L 25/01* (2013.01); *F16L 25/02* (2013.01); *Y02T 50/44* (2013.01)

(58) Field of Classification Search
  CPC ...... B64D 37/005; B64D 37/32; B64D 45/02; H02G 3/22
  USPC ....... 248/56, 57, 65, 70, 608, 609, 634, 636; 244/135 R; 174/151, 152 R, 152 G, 665, 174/668, 669
  See application file for complete search history.

(56) References Cited

U.S. PATENT DOCUMENTS

| | | | |
|---|---|---|---|
| 4,817,417 A | 4/1989 | Twerdochlib | |
| 5,545,854 A * | 8/1996 | Ishida | H02G 3/081 16/2.2 |
| 5,548,934 A * | 8/1996 | Israelson | A62C 2/065 52/1 |
| 5,967,567 A * | 10/1999 | Nordstrom | F16L 5/08 285/139.1 |
| 7,709,755 B2 * | 5/2010 | Pfister | B60R 16/0222 16/2.1 |
| 7,770,848 B2 | 8/2010 | Johnson et al. | |
| 8,196,934 B2 * | 6/2012 | Do | F01D 11/005 277/422 |
| 8,307,592 B2 * | 11/2012 | Chang | F16L 5/14 285/139.1 |
| 8,870,533 B2 * | 10/2014 | Casavant | F01D 25/285 415/213.1 |
| 8,894,014 B2 * | 11/2014 | Yonezawa | B64D 45/02 244/1 A |
| 8,987,612 B2 * | 3/2015 | Callahan | F16B 5/0258 174/653 |
| 9,061,768 B2 * | 6/2015 | Hansom | B64D 37/00 |
| 9,366,364 B2 * | 6/2016 | Wright | F16L 5/02 |
| 2013/0075150 A1 * | 3/2013 | Newbolt | B64D 45/02 174/360 |
| 2016/0356403 A1 * | 12/2016 | Perrigo | B64D 37/00 |

\* cited by examiner

ELECTROMAGNETIC EFFECTS-SENSITIVE PASS-THROUGH MOUNTING ASSEMBLIES WITH ADJUSTABLE OFFSET

FIELD

The present disclosure relates to electromagnetic effects-sensitive pass-through mounting assemblies with adjustable offset.

BACKGROUND

Pass-through mounts used to support tubing associated with hydraulic, fuel, and other systems may be used in environments in which they are subjected to potentially hazardous, corrosive, and/or harsh environments such as aircraft fuel systems and/or other potentially difficult environments. One example is the use of pass-through rib mounts to support hydraulic and fuel lines within aircraft wing fuel tanks. Aircraft wing fuel tanks are a demanding environment in which to provide secure and reliable retention of tubing. In particular, the space to install mountings may be confined, potential ignition sources (e.g., due to electromagnetic effects such as arcing due to lightning strikes and static discharge due to fuel transfer) must be avoided, the fuel may be chemically aggressive, and the fuel may lubricate mountings. With respect to electromagnetic effects, components within an aircraft fuel tank must meet stringent aviation safety requirements to ensure that metal objects within the fuel tank are properly bonded, grounded and/or isolated.

Some commercial aircraft wings are substantially constructed of composite materials. The composite materials generally are less conductive than traditional, metal components. Further, composite wings may provide lesser electromagnetic shielding than traditional metal wings. The lesser shielding may lead to higher induced currents in internal components of the wing (such as metal tubing).

Composite wings may have greater structural flexibility (relative to traditional, metal wings) and thus may subject internal tubing and mounts to greater relative movement and/or stresses. Moreover, the greater flexibility of composite wings may make the wings more sensitive to loads applied to the internal tubing, including loads applied by misalignment of the tubing and the centerline of the pass-through mount assemblies.

Thus, there is a need for pass-through mounting assemblies which are designed to reduce electromagnetic effects, accommodate alignment of tubing, and/or permit tubing movement.

SUMMARY

Pass-through mounting assemblies include an outer sleeve, an inner sleeve, a bushing component, and a cap that are configured to be assembled onto a partition aperture in a partition to retain a tube as the tube passes through the partition.

The outer sleeve includes a barrel section and a flange. The barrel section of the outer sleeve is sized to fit through the partition aperture in the partition. The flange is configured to abut a working side of the partition while the barrel section of the outer sleeve extends through the partition aperture.

The inner sleeve includes a barrel section and a ring section. The barrel section of the inner sleeve is sized to nest into the barrel section of the outer sleeve. The ring section of the inner sleeve has an outer shoulder that is configured to abut the flange of the outer sleeve. The ring section of the inner sleeve has an outer rim that is concentric with the barrel section of the inner sleeve. The ring section of the inner sleeve has an inner rim that is non-concentric with the barrel section of the inner sleeve. The ring section of the inner sleeve has an inner shoulder.

The bushing component includes a barrel section and a ring section. The barrel section of the bushing component defines a tube aperture configured to retain the tube passing through the partition aperture. The tube aperture is non-concentric with the ring section of the bushing component. The ring section of the bushing component has an outer rim that is sized to nest into the inner rim of the inner sleeve. The ring section of the bushing component is sized to abut the inner shoulder of the inner sleeve.

The retaining cap includes an inner rim and a top. The inner rim of the retaining cap is sized to nest over the outer rim of the inner sleeve. The top defines a cap aperture sized to permit the tube to pass through at any relative angular position of the retaining cap, the bushing component, and the inner sleeve.

Generally, the tube is electrically conductive, the partition aperture is defined by non-metallic material, and at least two of the mounting assembly components are electrically insulating.

Methods of retaining a tube passing through a partition aperture in a partition include inserting the tube through the partition aperture, placing components of a mounting assembly onto the tube, stacking the components onto the partition aperture, adjusting the relative angular positions of components, and coupling the components to the partition.

Placing the components includes threading an outer sleeve, an inner sleeve, and a retaining cap of a mounting assembly onto the tube on a working side of the partition. Placing the components also includes placing a bushing component of the mounting assembly onto the tube.

Stacking the components includes inserting the barrel section of the outer sleeve into the partition aperture, nesting the barrel section of the inner sleeve into the barrel section of the outer sleeve, nesting the outer rim of the bushing component into the inner rim of the ring section of the inner sleeve, and nesting the inner rim of the retaining cap over the outer rim of the ring section of the inner sleeve.

Adjusting the components includes adjusting the relative angular position of the bushing component, the inner sleeve, and the retaining cap to align the tube aperture with the tube as the tube passes through the partition.

Coupling the components includes coupling the retaining cap to the partition to lock the relative angular position of the bushing component, the inner sleeve, and the retaining cap.

DESCRIPTION

Figure 1:
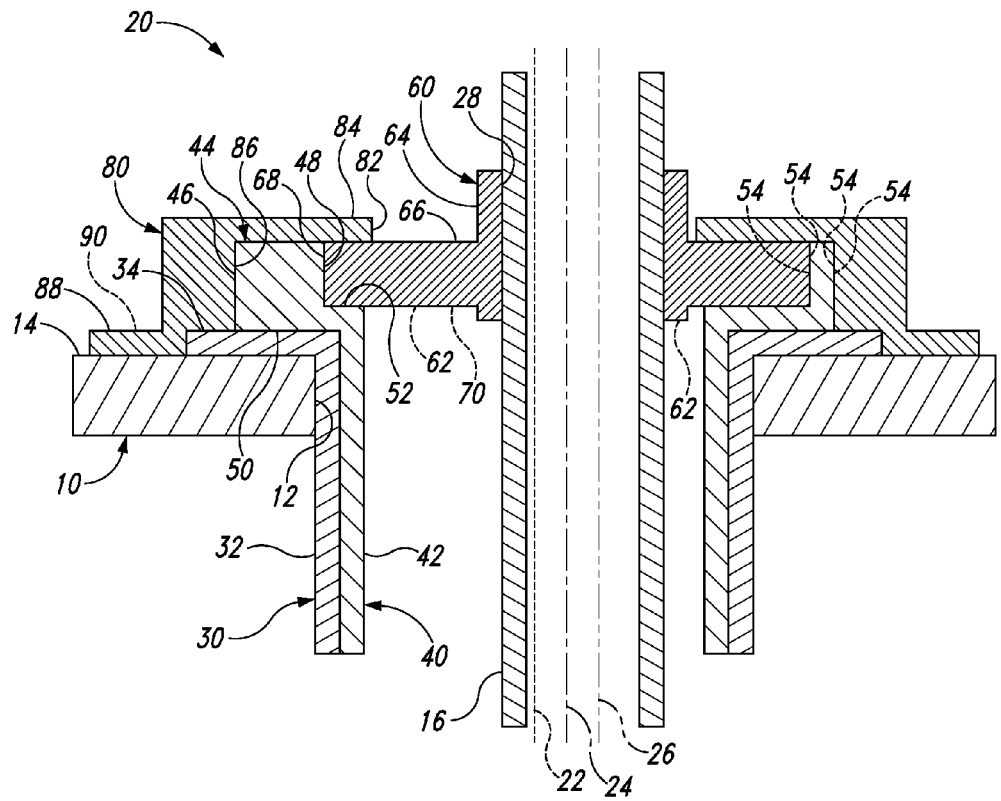
FIG. 1 is a schematic cross-sectional representation of an example of a pass-through mounting assembly as installed in a partition.

FIGS. 1-8 illustrate pass-through mounting assemblies and associated methods. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic cross-sectional representation of an example of a pass-through mounting assembly 20, which also may be called a clamp assembly, a fitting assembly, a tube mount assembly, and/or a tube clamp assembly. Mounting assemblies 20 are configured to secure and/or to retain a tube 16 in a tube aperture 28 as the tube 16 passes through a partition aperture 12 in a partition 10. The cross section of FIG. 1 is generally perpendicular to the partition 10.

Mounting assemblies 20 have at least three independent longitudinal axes (oriented along the length of the tube 16). These independent axes include a primary axis 22 (the central axis of the mounting assembly 20), a secondary axis 24 (an intermediate axis), and a tertiary axis 26 (the central axis of the tube 16 and the tube aperture 28). An example of the arrangement of the axes also is shown in the internal representation of FIG. 2, which is oriented perpendicular to the cross section of FIG. 1. The position of the tube aperture 28 is adjustable and may be selectively positioned angularly and/or radially to accommodate different positions of the tube aperture 28 and the tube 16 relative to the primary axis 22. The tube aperture 28 may be offset from the primary axis 22 to match the position of the tube 16 passing through the partition aperture 12. Thus, an off-center tube 16 may be secured and/or retained without applying a significant load to the tube 16. Mounting assemblies 20 may be configured to radially retain the tube 16 while permitting axial movement of the tube 16 within the mounting assembly 20. Such an embodiment may be useful where the partition 10 and/or a larger structure that includes the partition 10 and the tube 16 are relatively flexible, for example, where the partition 10 is a rib within an aircraft wing constructed of composite materials. Reducing the load on the tube 16 and/or the partition 10 may reduce stress and/or wear on the tube 16, associated fittings etc., and/or the partition 10. Reduced stress and/or wear may lead to fewer failures of these components. Further, reducing the load on the tube 16 and/or the partition 10 may save the weight of reinforcing structure that would be needed to support the partition 10 and/or associated structures.

Tubes 16 may be, and/or may include, conduit, lines, pipes, and/or ducts that convey fluids and/or signals (e.g., hydraulic fluid, fuel, electrical signals) through the partition 10. Tubes 16 typically are electrically conductive and relatively rigid, e.g., with metal walls. Tubes 16 may have an effective diameter of at least 5 mm, at least 10 mm, at least 20 mm, at least 50 mm, at most 200 mm, and/or at most 100 mm.

The partition 10 may be a wall, floor, bulkhead, panel, rib, structure, etc., and typically is a part of a larger structure, e.g., a container. For example, partition 10 may be a rib or other structure within a fuel system and/or an aircraft wing fuel tank. The partition aperture 12 may be a passage, a hole, an opening, and/or a channel through the partition 10. The partition aperture 12 is sized to permit the tube 16 to pass through the partition 10. Generally, the tube 16 may be threaded through (i.e., axially inserted through) the partition aperture 12. The partition 10 may define a passage, a channel, and/or a slot that connects the partition aperture 12 to the edge of the partition 10 to permit the tube 16 to be inserted into the partition aperture 12 without threading the tube 16 through the partition aperture 12 (i.e., the tube 16 may be longitudinally, or radially, inserted into the partition aperture 12 to pass through the partition aperture 12).

The partition 10, the mounting assembly 20, and the tube 16 may be subject to electromagnetic effects such as lightning strikes, induced currents, and static discharge (e.g., due to charge accumulation during fuel transfer). Partitions 10 may be electrically insulating, non-conductive, and/or electrically resistive, properties which may exacerbate electromagnetic effects by limiting electrical shielding and/or charge conduction paths. Partitions 10 may include a non-metallic material proximate to the partition aperture 12 and the mounting assembly 20. For example, the non-metallic material may define the partition aperture 12 and/or may be a composite material such as carbon fiber reinforced polymer composite.

Mounting assemblies 20 may be configured to electrically isolate the tube 16 from the partition 10, any optional fasteners used to secure the mounting assembly 20 on the partition 10, and/or other neighboring metallic structures. Mounting assemblies 20 may be electrically insulating and configured to prevent sparks and/or arcing between the tube 16 and the partition 10, in particular when subject to an electromagnetic effect such as a lightning event or a static charge accumulation. For example, one or more (optionally all) components of mounting assemblies 20 may be electrically insulating. Mounting assemblies 20, and components thereof, may be sized to establish a physical separation between the tube 16 and the partition 10 sufficient to avoid electrical breakdown (dielectric breakdown) of the medium between tube 16 and the partition 10 (at voltages associated with electromagnetic effects). The medium between the tube 16 and the partition 10 may include, for example, liquid, gas, fuel, water, air, and/or nitrogen. Additionally or alternatively, mounting assemblies 20, and components thereof, may be sized and/or selected to avoid the effects of electrical surface flashover (dielectric breakdown at a surface). Hence, the surface path, the surface resistivity, and/or the bulk resistivity of the mounting assemblies 20 and components thereof may be sized and/or selected to establish a sufficiently long surface path and/or sufficiently high breakdown voltage. For example, mounting assemblies 20 may establish a minimum physical separation (to avoid arcing due to dielectric breakdown) of at least 2 mm, at least 5 mm, and/or at least 10 mm. As another example, mounting assemblies 20 may establish a minimum electrically insulating surface path (to avoid surface flashover) of at least 5 mm, at least 10 mm, and/or at least 20 mm.

The environment proximate to the partition 10, the mounting assembly 20, and the tube 16 may be potentially hazardous (e.g., flammable, explosive, caustic), corrosive, and/or harsh (e.g., chemically aggressive and/or subject to temperature extremes). Hence, mounting assemblies 20 may be configured to withstand the surrounding operating environment. Mounting assemblies 20 may be configured to be exposed to a liquid environment, a gaseous environment, a wet environment, a dry environment, solvents, fuels, oxidizers, reducing agents, acids, and/or bases. Mounting assemblies 20 may be configured to withstand the physical stresses of high temperature, low temperature, temperature variations, and/or substances which freeze, melt, condense, and/or evaporate. For example, mounting assemblies 20 may be configured to withstand temperatures of at most 150° C., at most 100° C., at most 40° C., at most 10° C., at most 0° C., at most −20° C., at least −60° C., at least 0° C., at least 10° C., at least 40° C., at least 70° C., and/or at least 100° C. Further, mounting assemblies 20 may be configured to withstand physical stresses such as compression, elongation, torsion, abrasion, etc., for example, due to relative movement of the partition 10 and the tube 16. Different components of mounting assemblies 20 (e.g., at least two components) may be formed of different materials, for example, to reduce the risk of common-mode failures of the components (i.e., the risk of simultaneous failure due to the same condition).

Examples of suitable materials for components of mounting assemblies 20 include one or more of plastic, polymer, polyamide (e.g., NYLON-brand polyamide), fluoropolymer (e.g., TEFLON-brand fluoropolymer, polytetrafluoroethylene (PTFE), perfluoroalkoxy polymer resin (PFA), and fluorinated ethylene propylene (FEP)), polyurethane, polyester, polyacrylic, polycarbonate, polyether ether ketone (PEEK), epoxy, glass, and ceramic. Components of mounting assemblies 20 may include, and/or may be formed of, composite materials, e.g., fiber- and/or particulate-filled polymer materials which may include, e.g., fiberglass, carbon fiber, and/or minerals. For example, components of mounting assemblies 20 may include LYTEX-brand structural composite material (which is a chopped fiber-reinforced epoxy composite).

As indicated in the schematic representation of FIG. 1, mounting assemblies 20 include an outer sleeve 30, an inner sleeve 40, a bushing component 60, and a cap 80. The outer sleeve 30 is configured to fit through the partition aperture 12 and against a working side 14 of the partition 10. The inner sleeve 40 is configured to fit into the outer sleeve 30. The bushing component 60 defines the tube aperture 28 and is configured to fit into the inner sleeve 40 and to retain and/or to secure the tube 16 within the tube aperture 28. The cap 80, also called a retaining cap, is configured to retain the bushing component 60, the inner sleeve 40, and the outer sleeve 30 together and against the working side 14 of the partition 10. The outer sleeve 30, the inner sleeve 40, the bushing component 60, and the cap 80 are configured to stack and/or to nest together, at least partially in the partition aperture 12 and against the working side 14. The small number of basic components of mounting assemblies 20 may reduce the installation burden (e.g., time and/or complexity to install), costs (e.g., inventory cost, installation cost, repair cost), and/or total weight relative to larger numbers of components.

The inner sleeve 40, the bushing component 60, and the cap 80, collectively and individually, are configured to selectively position (angularly and/or radially) the tube aperture 28 (and the tertiary axis 26) relative to the primary axis 22. Thus, different positions of the tube aperture 28 and the tube 16 relative to the primary axis 22 may be accommodated by adjusting the relative position and/or orientation of the inner sleeve 40, the bushing component 60, and/or the cap 80.

When assembled, mounting assemblies 20 have the components (e.g., the outer sleeve 30, the inner sleeve 40, the bushing component 60, and the cap 80) arranged such that the tube 16 is spaced away from the partition 10 and the individual components are arranged to reduce arcing due to dielectric breakdown of the medium between the tube 16 and the partition 10 and due to surface flashover across one or more of the components. The outer sleeve 30 contacts the working side 14 of the partition 10 and spaces and/or separates the inner sleeve 40 away from the partition 10. The bushing component 60 contacts the tube 16 and spaces and/or separates the inner sleeve 40 from the tube 16. Thus, mounting assemblies 20 may be arranged to provide at least three layers of electrical isolation between the tube 16 and the partition 10. Mounting assemblies 20 may be configured and/or arranged to provide at least two, at least three, at least four, or more layers of electrical isolation. The cap 80 contacts the working side 14 of the partition 10 and may be spaced and/or separated away from the tube 16 by the bushing component 60 and/or the inner sleeve 40.

As used herein, over, under, above, below, top, bottom, forward, and rearward refer to the perspective of one on the working side 14 of the partition 10 and/or as the mounting assembly 20 would be assembled on the working side 14. For example, as illustrated in the example of FIG. 1, the bottommost component of the mounting assembly 20 may be the outer sleeve 30, which contacts the working side 14. The topmost component of the mounting assembly may be the cap 80, which at least partially covers the other components. The forward direction is the direction from the working side 14 to the observer. The rearward direction is the direction from the working side 14 away from the observer. Thus, the cap 80 is forward of the working side 14. Some portions of the mounting assembly 20 (e.g., portions of the outer sleeve 30 and the inner sleeve 40 extend rearward from the working side 14. As used herein, inside, outside, inner and outer are relative to the relevant central axis (e.g., primary axis 22, secondary axis 24, and/or tertiary axis 26). Hence, the outer sleeve 30 is at least partially outside of the inner sleeve 40, and the outer wall of the tube 16 passes through the inside of the bushing component 60.

Outer sleeve 30 has a barrel section 32 and a flange 34 at one end of the barrel section 32. The end with the flange 34 may be referred to as the flange end, the front end, and/or the top end. The outer sleeve 30 may be a monolithic piece, i.e., the flange 34 and the barrel section 32 may be integral to each other and/or bonded, fused, welded, etc. together. The outer sleeve 30 may be configured to, and/or may be, adhered, bonded, coupled, and/or fastened to the partition 10 (e.g., on the working side 14 of the partition 10), the inner sleeve 40, and/or the cap 80.

The interior of the barrel section 32 is configured to accept the inner sleeve 40. The central axis of the interior of the barrel section 32 is the primary axis 22 of the mounting assembly 20 when assembled. When assembled, the inner sleeve 40 generally contacts the interior of the barrel section 32. The exterior of the barrel section 32 is sized to fit through the partition aperture 12 and may fit concentrically within the partition aperture 12. The exterior of the barrel section 32 may be concentric with the interior of the barrel section 32 and, hence, the primary axis 22 may also be the central axis of the exterior of the barrel section 32 and/or the partition aperture 12. The barrel section 32 may be a shell, e.g., a cylindrical shell.

The flange 34 projects radially outward around the circumference of the outer surface of the barrel section 32. The flange 34 typically is rotationally symmetric (e.g., circular) and concentric with the primary axis 22, but may have a different profile and/or a different center in different embodiments. The flange 34 is configured to abut the working side 14 of the partition 10 around the edge of the partition aperture 12 when the outer sleeve 30 is positioned in the partition aperture 12 (i.e., with the barrel section 32 extending through the partition aperture 12). That is, the flange 34 is configured to overlay the partition 10 around the edge of the partition aperture 12 on the working side 14. Hence, the profile of the flange 34 may be larger than the cross section of the partition aperture 12 and/or at least some portion of the flange 34 has a transverse extent greater than the transverse extent (e.g., diameter) of the partition aperture 12. The flange 34 generally lies flush against the working side 14 of the partition 10. Further, the flange 34 is configured to abut the inner sleeve 40, to underlay at least a portion of the inner sleeve 40. The inner sleeve 40 generally contacts the flange 34.

Outer sleeve 30 is sized to axially insert the tube 16, optionally with fittings, ferrules, and/or connectors on the tube 16, through the outer sleeve 30. The act of axially inserting the tube 16 through the outer sleeve 30 may be called threading the tube 16 through the outer sleeve 30. Additionally or alternatively, the outer sleeve 30 may be configured to permit the tube 16 to be longitudinally (radially) inserted into the outer sleeve 30. For example, the outer sleeve 30 may be split longitudinally (along the length of the primary axis 22) to accept the tube 16 and/or may include multiple members which may be assembled around the tube 16 and/or within the partition aperture 12.

Inner sleeve 40 has a barrel section 42 and a ring section 44 at one end of the barrel section 42. The end with the ring section may be referred to as the ring end, the front end, and/or the top end. The inner sleeve 40 may be a monolithic piece, i.e., the ring section 44 and the barrel section 42 may be integral to each other and/or bonded, fused, welded, etc. together. The inner sleeve 40 may be configured to, and/or may be, adhered, bonded, coupled, and/or fastened to the outer sleeve 40, the bushing component 60, and/or the cap 80.

The barrel section 42 of the inner sleeve 40 is configured to fit, optionally concentrically, inside the barrel section 32 of the outer sleeve 30 (e.g., the barrel section 42 may be sized to nest into the barrel section 32). The barrel section 42 may be configured to contact the barrel section 32 and may be configured to fit in a close relationship, e.g., a slip fit. The central axis of the barrel section 42 (at least of the exterior of the barrel section 42) is the primary axis 22 of the mounting assembly 20 when assembled. The barrel section 42 may be a shell, e.g., a cylindrical shell.

The ring section 44 extends radially outward around the circumference of the outer surface of the barrel section 42. The ring section 44 forms an outer shoulder 50 that is configured to abut the flange 34 of the outer sleeve 30, i.e., the outer shoulder 50 is configured to overlay the flange 34.

The outer shoulder 50 generally contacts the flange 34. Generally, the profile of the outer shoulder 50 may be smaller than the profile of the flange 34 and/or at least some portion of the outer shoulder 50 has a transverse extent less than the transverse extent (e.g., diameter) of the flange 34. For example, the effective diameter of the outer shoulder 50 may be less than the effective diameter of the flange 34. Additionally, the ring section 44 forms an inner shoulder 52 that is configured to abut the bushing component 60, i.e., the inner shoulder 52 is configured to underlay at least a portion of the bushing component 60. The bushing component 60 generally contacts the inner shoulder 52.

Figure 2:
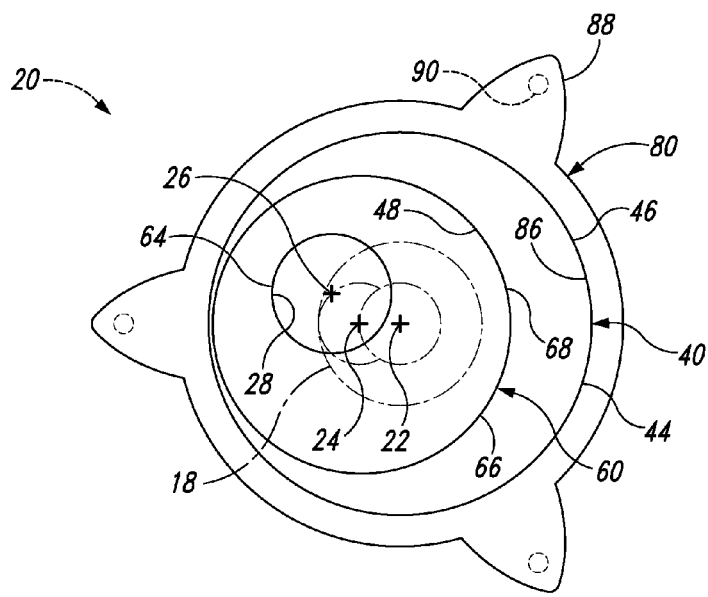
FIG. 2 is a schematic internal representation of an example of a pass-through mounting assembly.

The ring section 44 defines an outer rim 46 that is concentric with the barrel section 42. Thus, the central axis of the outer rim 46 is the primary axis 22 of the mounting assembly 20 when assembled. The outer rim 46 typically is rotationally symmetric (about the primary axis 22). The outer rim 46 is configured to fit within and to nest into the cap 80. The outer rim 46 generally contacts the cap 80. Additionally, the ring section 44 defines an inner rim 48 that is non-concentric (eccentric) with the outer rim 46, as also seen in FIG. 2. The central axis of the inner rim 48 is the secondary axis 24 of the mounting assembly 20 when assembled. The inner rim 48 typically is rotationally symmetric (about the secondary axis 24). The inner rim 48 is configured to accept at least a portion of the bushing component 60. The inner rim 48 generally contacts the bushing component 60.

Because the inner rim 48 is eccentrically located (i.e., the secondary axis 24 is displaced from the primary axis 22), rotation of the inner sleeve 40 about the primary axis 22 (e.g., rotation of the inner sleeve 40 relative to the outer sleeve 30, the cap 80, and/or the partition 10) changes the angular position of the secondary axis 24 within the mounting assembly 20 and/or with respect to the partition 10. Thus, the inner sleeve 40 may be a rotatable member of the mounting assembly 20 that is configured to selectively and angularly position the bushing component 60, the tube aperture 28, and any installed tube 16, relative to the mounting assembly 20 and/or the partition 10.

Inner sleeve 40 is sized to axially insert the tube 16, optionally with fittings, ferrules, and/or connectors on the tube 16, through the inner sleeve 40. The act of axially inserting the tube 16 through the inner sleeve 40 may be called threading the tube 16 through the inner sleeve 40. Additionally or alternatively, the inner sleeve 40 may be configured to permit the tube 16 to be longitudinally (radially) inserted into the inner sleeve 40. For example, the inner sleeve 40 may be split longitudinally (along the length of the primary axis 22) to accept the tube 16 and/or may include multiple members which may be assembled around the tube 16 and/or within the outer sleeve 30. The inner sleeve 40 may be sized to permit the tube 16 to pass through at any relative angular position of the cap 80, the bushing component 60, the inner sleeve 40, and the outer sleeve 30.

Bushing component 60 has a barrel section 64 and a ring section 66. The bushing component 60 may be a monolithic piece, i.e., the barrel section 64 and the ring section 66 may be integral to each other and/or bonded, fused, welded, etc. together. The bushing component 60 may be configured to, and/or may be, adhered, bonded, coupled, and/or fastened to the inner sleeve 40, the cap 80, and/or the tube 16.

The ring section 66 extends radially outward from the barrel section 64. The ring section 66 has an outer rim 68 that is configured to fit at least partially within the inner rim 48 of the inner sleeve 40. The ring section 66 is configured to abut the inner shoulder 52 of the inner sleeve 40, i.e., the ring section 66 is configured to overlay the inner shoulder 52. The ring section 66 generally contacts the inner shoulder 52.

The outer rim 68 is defined by the ring section 66 and is configured to nest into and to contact the inner rim 48 of the inner sleeve 40. The central axis of the outer rim 68 is the secondary axis 24 of the mounting assembly 20 when assembled. The outer rim 68 typically is rotationally symmetric (about the secondary axis 24). The outer rim 68 (of the bushing component 60) may be configured to mate and/or to interlock with the inner rim 48 (of the inner sleeve 40) and may be configured to mate and/or to interlock in any one of a plurality of angular positions. For example, the outer rim 68 and the inner rim 48 may include mating spline members 54.

The barrel section 64 is configured as a bushing around the tube 16 and defines the tube aperture 28. The barrel section 64 may extend forward and/or rearward of the ring section 66. Alternatively, the barrel section 64 may not extend forward or rearward of the ring section 66 and may be an inner surface of the ring section 66 that defines the tube aperture 28.

The barrel section 64 and the tube aperture 28 are sized to accept, to contact, to retain, to secure and/or to clamp the outer wall of the tube 16. Thus, when the mounting assembly 20 is assembled, the barrel section 64 may accept, contact, retain (e.g., radially restrain), secure, and/or clamp the tube 16 within the tube aperture 28. The barrel section 64 and the tube aperture 28 may be configured to permit axial movement of the tube 16 within the tube aperture 28. For example, the tube aperture 28 may be sized for a close fit (e.g., a clearance fit, a slip fit, or an interference fit) over the tube 16 and/or the interior of the barrel section 64, which defines the tube aperture 28, may include a low friction material (e.g., a fluoropolymer) and/or an abrasion resistant material.

The tube aperture 28 is non-concentric (eccentric) with the ring section 66 and the outer rim 68, as also seen in FIG. 2. The central axis of the tube aperture 28 is the tertiary axis 26 of the mounting assembly 20 when assembled. Because the tube aperture 28 is eccentrically located, the tertiary axis 26 (the central axis of the tube aperture 28) is displaced from the secondary axis 24 (the central axis of the outer rim 68). In this embodiment, rotation of the bushing component 60 about the secondary axis 24 (e.g., rotation of the bushing component 60 relative to the inner sleeve 40) changes the angular position of the tertiary axis 26 within the mounting assembly 20 and/or with respect to the partition 10. Thus, the bushing component 60 may be a rotatable member of the mounting assembly 20 that is configured to selectively and angularly position the tube aperture 28, and any installed tube 16, relative to the mounting assembly 20 and/or the partition 10.

Figure 6:
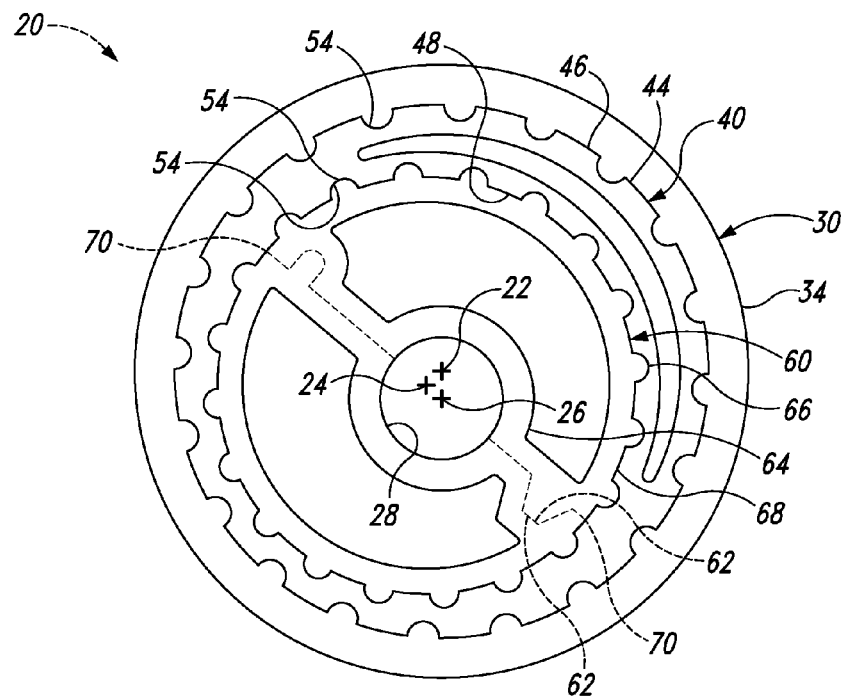
FIG. 6 is a top view of an arrangement of internal components of an example of a pass-through mounting assembly.
Figure 7:
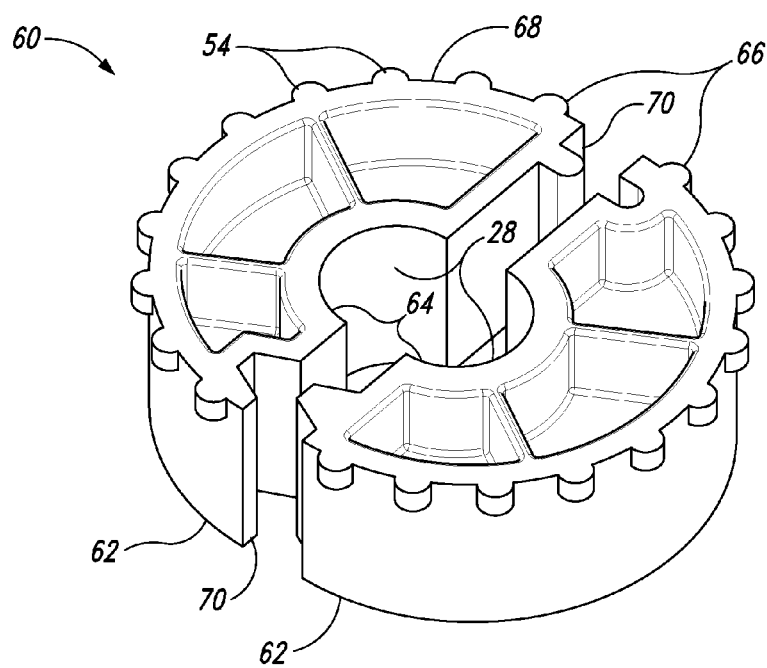
FIG. 7 is an example of a bushing component that includes two bushing component members.

Bushing component 60 is configured to permit the tube 16 to be longitudinally (radially) inserted into the bushing component 60. The bushing component 60 may be split longitudinally (along the length of the primary axis 22) to accept the tube 16. For example, the bushing component 60 may define an axial slit 70 (as best seen in FIGS. 6-7) that is configured to radially insert the tube 16 into the tube aperture 28. The bushing component 60 may include multiple bushing component members 62 (as best seen in FIGS. 6-7) which may be assembled around the tube 16 and/or within the inner sleeve 40. For example, the bushing component members 62 may be configured to separate to accept the tube radially and/or axially and configured to couple together (e.g., by mating features, snaps, ridges, and/or grooves) to retain the tube within the tube aperture. The bushing component 60 may be configured to positively lock and/or retain the tube 16 within the tube aperture 28 even outside of the mounting assembly 20 (i.e., without the assistance and/or support of other mounting assembly 20 components and/or without external force applied). Such a configuration may be useful to facilitate one-handed installation and/or installation within a confined space as the tube 16 may be inserted into the tube aperture 28 and strung on the tube 16 along with the other components before final assembly of the mounting assembly 20.

Cap 80 has a top 84 that defines a cap aperture 82. The cap 80 is configured to at least partially overlay and/or cover the outer sleeve 30, the inner sleeve 40, and/or the bushing component 60. The cap 80 is configured to retain, and/or to secure the outer sleeve 30, the inner sleeve 40, and/or the bushing component 60 against the working side 14 of the partition 10. The cap 80 may be configured to, and/or may be, adhered, bonded, coupled, and/or fastened to the outer sleeve 30, the inner sleeve 40, the bushing component 60, the partition 10, and/or the working side of the partition 10.

Cap 80 defines an inner rim 86 that is configured to fit over, to nest over, and/or to contact the outer rim 46 of the inner sleeve 40. The central axis of the inner rim 86 of the cap 80 is the primary axis 22 of the mounting assembly 20 when assembled. The inner rim 86 typically is rotationally symmetric (about the primary axis 22). The inner rim 86 (of the cap 80) may be configured to mate and/or to interlock with the outer rim 46 (of the inner sleeve 40) and may be configured to mate and/or to interlock in any one of a plurality of angular positions. For example, the inner rim 86 and the outer rim 46 may include mating spline members 54.

Cap aperture 82 is sized to axially insert the tube 16, optionally with fittings, ferrules, and/or connectors on the tube 16, through the cap aperture 82. The act of axially inserting the tube 16 through the cap aperture 82 may be called threading the tube 16 through the cap 80 and/or the cap aperture 82. Additionally or alternatively, the cap 80 may be configured to permit the tube 16 to be longitudinally (radially) inserted into the cap 80. For example, the cap 80 may be split longitudinally (along the length of the primary axis 22) to accept the tube 16 and/or may include multiple members which may be assembled around the tube 16 and/or over the outer sleeve 30, inner sleeve 40, and/or the bushing component 60. The cap aperture 82 may be sized to permit the tube 16 to pass through at any relative angular position of the cap 80, the bushing component 60, the inner sleeve 40, and the outer sleeve 30.

Cap 80 may include one or more feet 88 that are configured to be adhered, bonded, coupled, and/or fastened to the working side 14 of the partition 10. The feet 88 may be circumferentially spaced (optionally evenly spaced) about the perimeter of the cap 80, as seen in the example of FIG. 2. Though FIG. 2 illustrates an example of three feet 88, cap 80 may include one, two, three, four, or more than four feet 88. The feet 88 may include one or more fastener apertures 90 configured to accept a fastener to couple the cap 80 to the partition 10. Fasteners may be bolts, rivets, hooks, clips, etc. and may be metallic or non-metallic. Fasteners, particularly if electrically conductive, may be sealed with an electrically insulating covering (e.g., cap sealed) to isolate the tube 16 from the partition 10 by another layer of electrical insulation.

The cap 80 may be configured to contain and/or retain the outer sleeve 30, the inner sleeve 40, and/or the bushing component 60 on the partition 10 even if a component is damaged, worn or otherwise compromised (e.g., due to wear and tear, chemical degradation, etc.). For example, the top 84 and/or the cap 80 may cover a substantial portion of the outer sleeve 30, the inner sleeve 40, and/or the bushing component 60. If one of the components breaks into separate parts, those parts may still be retained within the cap 80. Hence, the mounting assembly 20 and/or the cap 80 may be configured to reduce and/or contain foreign object debris that may be generated within the mounting assembly 20. Such configuration may be useful, e.g., in a fuel tank, a fuel system, and/or other systems for handling and/or storing liquid substances.

As seen in FIG. 2, mounting assembly 20 includes at least two eccentric components, e.g., at least the inner sleeve 40 and the bushing component 60. The configurations of the components of the mounting assembly 20 permit the adjustment of the tube aperture 28 (and the tertiary axis 26) about the primary axis 22. By turning the inner sleeve 40 relative to the cap 80 and/or partition 10, the secondary axis 24 may be swept about the primary axis 22. By turning the bushing component 60 relative to the inner sleeve 40, the tertiary axis 26 may be swept about the secondary axis 24. Combined, the locus 18 of obtainable tertiary axis 26 positions may include fully centered (where the tertiary axis 26 is coaxial with the primary axis 22) and locations off-center (non-coaxial). Examples of off-center locations include distances between the primary axis 22 and the tertiary axis 26 of at least 5 mm, at least 10 mm, at least 20 mm, at most 100 mm, and/or at most 50 mm. As discussed further herein, the range of locations of the tube aperture 28 permits the mounting assembly 20 to retain the tube 16 without applying significant load to the tube 16 and/or the partition 10.

The double-eccentric design (with at least two eccentric components) permits the tube 16 to pass through a range of locations that span an area larger than would be possible with a single-eccentric design (with a single eccentric component). In a single-eccentric design, the moving axis may be swept about the center axis in a circle (i.e., the locus of axis positions would be a circle in the view of FIG. 2). In a double-eccentric design, the sweep of secondary axis 24 about the primary axis 22 and the sweep of the tertiary axis 26 about the secondary axis 24 combine to form a locus 18 that is, in the view of FIG. 2, an annulus (not shown in FIG. 2) or a disk (as shown in FIG. 2). The shape of the locus 18 is determined largely by the distance between the primary axis 22 and the secondary axis 24 and the distance between the secondary axis 24 and the tertiary axis 26. The locus 18 may be shaped like a disk if the distance between the tertiary axis 26 and the secondary axis 24 is greater than or equal to the distance between the primary axis 22 and the secondary axis 24. In some embodiments, the distance between the primary axis 22 and the secondary axis 24 is substantially the same as the distance between the secondary axis 24 and the tertiary axis 26.

Mounting assemblies 20 may be in the form a kit, in which the components such as the outer sleeve 30, the inner sleeve 40, the bushing component 60, and the cap 80 are present, and/or in the form of a finished assembly, in which the components are combined and/or combined with partition 10 and/or tube 16, as discussed further herein. Where a component, such as the outer sleeve 30, the inner sleeve 40, the bushing component 60, and the cap 80, is described as configured to contact, to secure, to retain, to fit, to mate, etc., the component in the assembled mounting assembly 20 may contact, secure, retain, fit, mate, etc. as described.

Figure 3:
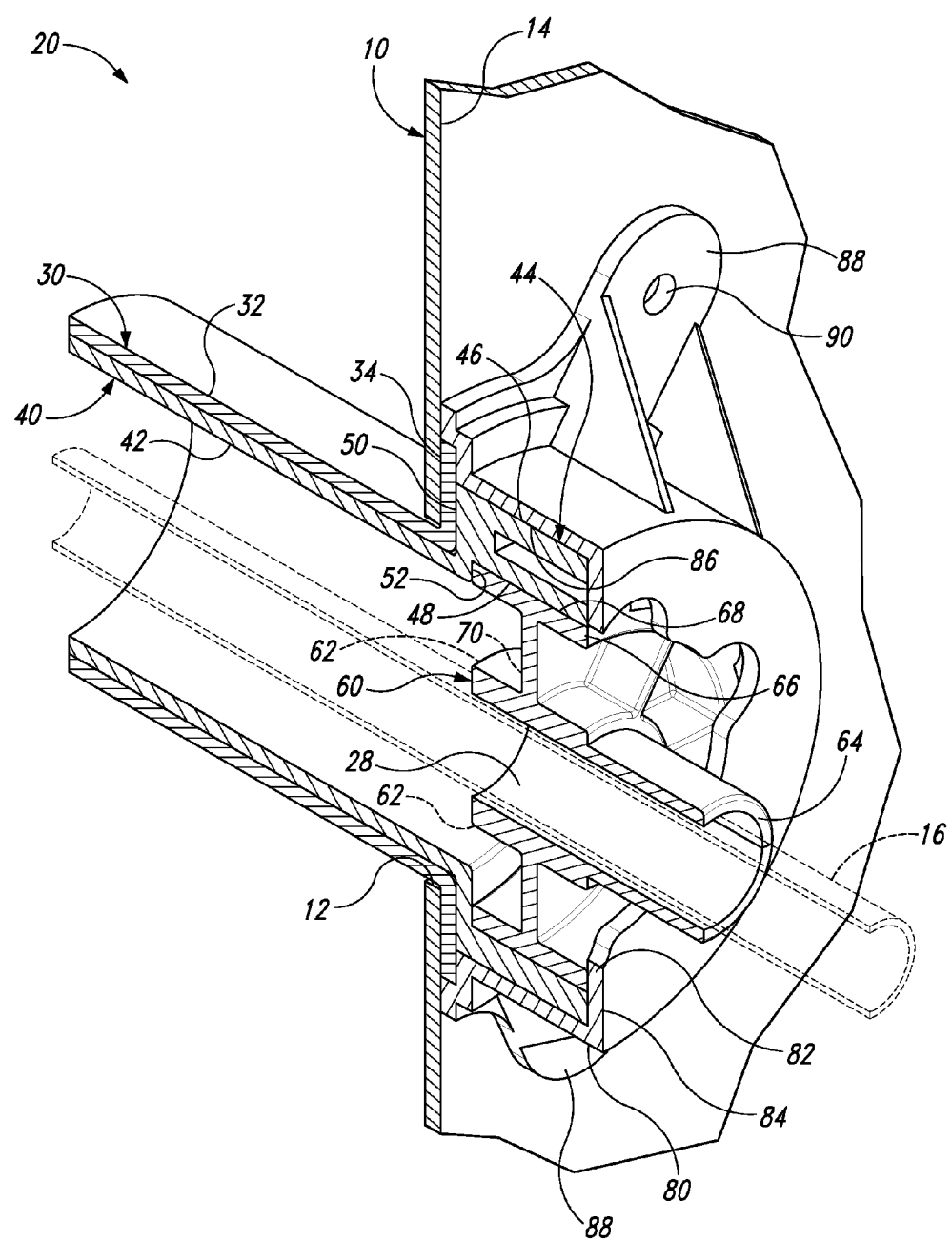
FIG. 3 is a perspective, cross-sectional view of an example of a pass-through mounting assembly as installed in a partition.

FIG. 3 illustrates an example mounting assembly 20 as assembled on and in the partition aperture 12. The outer sleeve 30 is coaxial with the partition aperture 12, with the barrel section 32 extending through and contacting the partition aperture 12. The flange 34 of the outer sleeve 30 is a circular flange that is concentric with the barrel section 32. The flange 34 overlays and contacts the working side 14 of the partition 10 in a region surrounding the partition aperture 12. The inner sleeve 40 is coaxially nested into the outer sleeve 30. Specifically, the barrel section 42 of the inner sleeve 40 contacts the barrel section 32 of the outer sleeve 30 in a close, e.g., slip fit, relationship. The outer shoulder 50 of the inner sleeve 40 abuts and contacts the flange 34 of the outer sleeve 30. The bushing component 60 is nested into the inner rim 48 of the inner sleeve 40. Specifically, the outer rim 68 of the bushing component 60 contacts the inner rim 48 of the inner sleeve 40. The bushing component 60 abuts and contacts the inner shoulder 52 of the inner sleeve 40. As assembled, the heights (distance above the working side 14) of the ring section 66 of the bushing component 60 and the ring section 44 of the inner sleeve 40 are substantially the same. The tube 16 is retained in, and radial movement is restricted by, the tube aperture 28 of the bushing component 60. The cap 80 nests over the other components, with the top 84 retaining and contacting the bushing component 60 and the inner sleeve 40. The feet 88 of the cap 80 abut and contact the working side 14 of the partition 10 and are configured to be fastened to the partition 10 (e.g., by fasteners inserted through the fastener apertures 90).

Mounting assemblies 20 may be configured for one-handed installation and/or installation from the working side 14 of the partition 10. One-handed installation may be useful in confined spaces that would ordinarily be extremely difficult if not impossible to install with two hands. As seen in the example of FIG. 3, the outer sleeve 30 may be configured to be inserted into the partition aperture 12 from the working side 14 (e.g., the barrel section 32 fits through the partition aperture 12 and the flange 34 stops at the partition 10). Because the barrel section 32 of the outer sleeve 30 fits closely within the partition aperture 12, the outer sleeve 30 may be loosely retained in the partition aperture 12 without any clips, fasteners, or other retaining mechanism during assembly of the mounting assembly 20. The outer sleeve 30 is configured to thread over the tube 16 and, hence, may remain captive on the tube 16 during assembly of the mounting assembly 20.

Continuing the example of the installation in FIG. 3, the inner sleeve 40 may be configured to be inserted into the barrel section 32 of the outer sleeve 30 from the working side 14 (e.g., the barrel section 42 of the inner sleeve 40 fits through the barrel section 32 of the outer sleeve 30 and the outer shoulder 50 of the inner sleeve 40 stops at the flange 34 of the outer sleeve 30). Because the barrel section 42 of the inner sleeve 40 fits closely within the barrel section 32 of the outer sleeve 30, the inner sleeve 40 may be loosely retained in the outer sleeve 30 (which may be in or out of the partition aperture 12) without any clips, fasteners, or other retaining mechanism during assembly of the mounting assembly 20. The inner sleeve 40 is configured to thread over the tube 16 and, hence, may remain captive on the tube 16 during assembly of the mounting assembly 20.

Continuing the example of the installation in FIG. 3, the bushing component 60 may be configured to be placed on the tube 16 (e.g., assembled around the tube 16) and may be configured to be inserted into the inner sleeve 40 from the working side 14 (e.g., the outer rim 68 of the bushing component 60 fits into the inner rim 48 of the inner sleeve 40 and the inner shoulder 52 of the inner sleeve 40 stops the bushing component 60 from further insertion). Because outer rim 68 of the bushing component 60 fits closely, and may interlock, with the inner rim 48 of the inner sleeve 40, the bushing component 60 may be loosely retained in the inner sleeve 40 (which may or may not be assembled to the outer sleeve 30) without any clips, fasteners, or other retaining mechanism during assembly of the mounting assembly 20. The bushing component 60 may remain captive on the tube 16 during assembly of the mounting assembly 20. Where the bushing component 60 is configured to be assembled over the tube 16 (e.g., the bushing component 60 includes two or more bushing component members 62 and/or includes an axial slit 70), the bushing component 60 may be assembled into a locked configuration that encircles the tube 16 such that the bushing component 60 remains captive on the tube 16 during assembly of the mounting assembly 20.

Continuing the example of the installation in FIG. 3, the cap 80 may be configured to fit over the bushing component 60, the inner sleeve 40, and the outer sleeve 30 from the working side 14 (e.g., the inner rim 86 of the cap 80 fits over the outer rim 46 of the inner sleeve 40 and the top 84 of the cap 80 contacts at least the bushing component 60 and the inner sleeve 40). The one or more feet 88 of the cap 80 abut the working side 14 outside of the flange 34 of the outer sleeve 30 and outside of the inner sleeve 40 and the bushing component 60. Because the inner rim 86 of the cap 80 fits closely, and may interlock, with the outer rim 46 of the inner sleeve 40, the cap 80 may be loosely retained over the inner sleeve 40 (with the bushing component 60 assembled between the cap 80 and the inner sleeve 40) without any clips, fasteners, or other retaining mechanism during assembly of the mounting assembly 20. The cap 80 is configured to thread over the tube 16 and, hence, may remain captive on the tube 16 during assembly of the mounting assembly 20.

Figure 4:
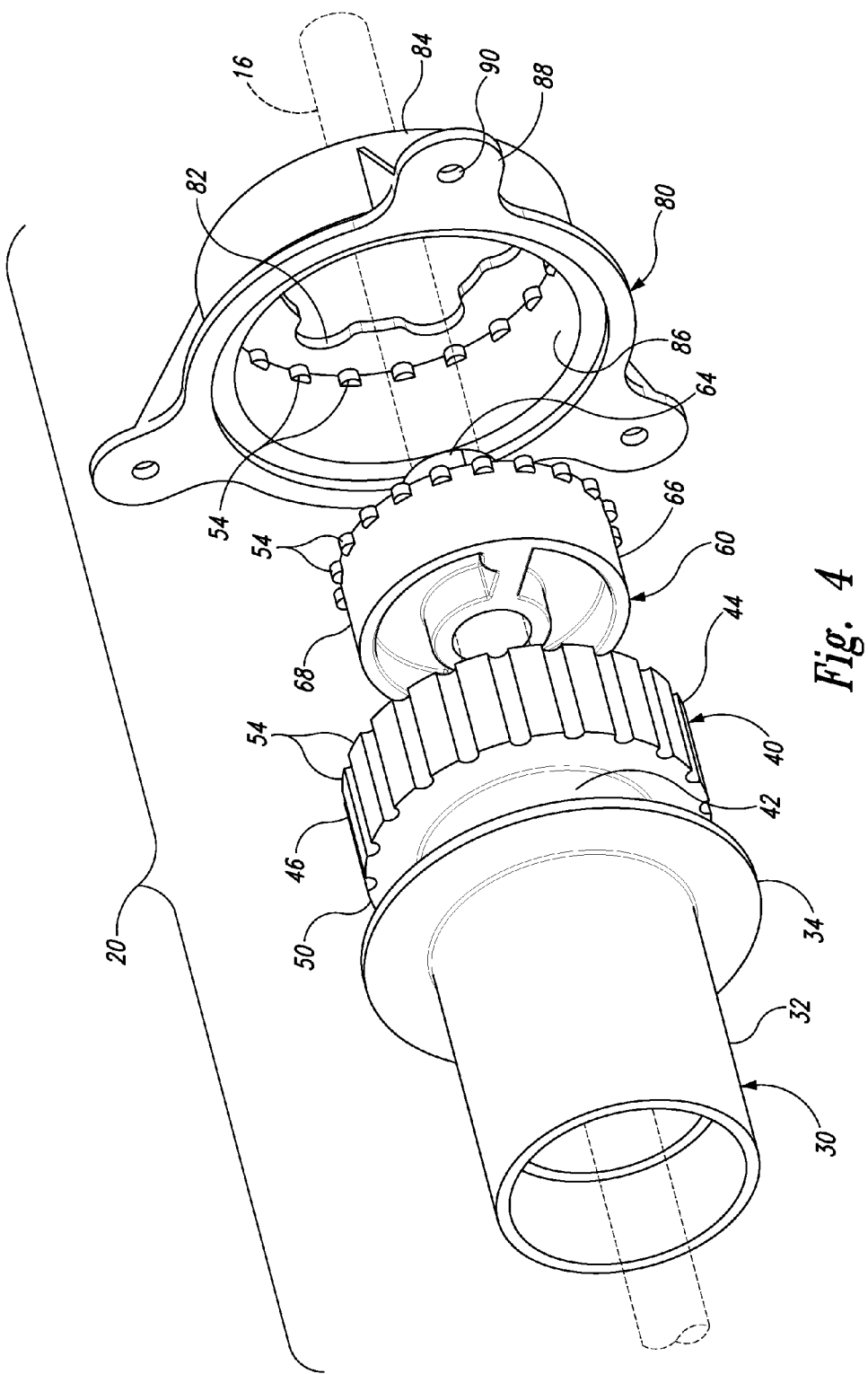
FIG. 4 is a perspective, exploded view of an example of a pass-through mounting assembly, as seen from a rearward perspective.
Figure 5:
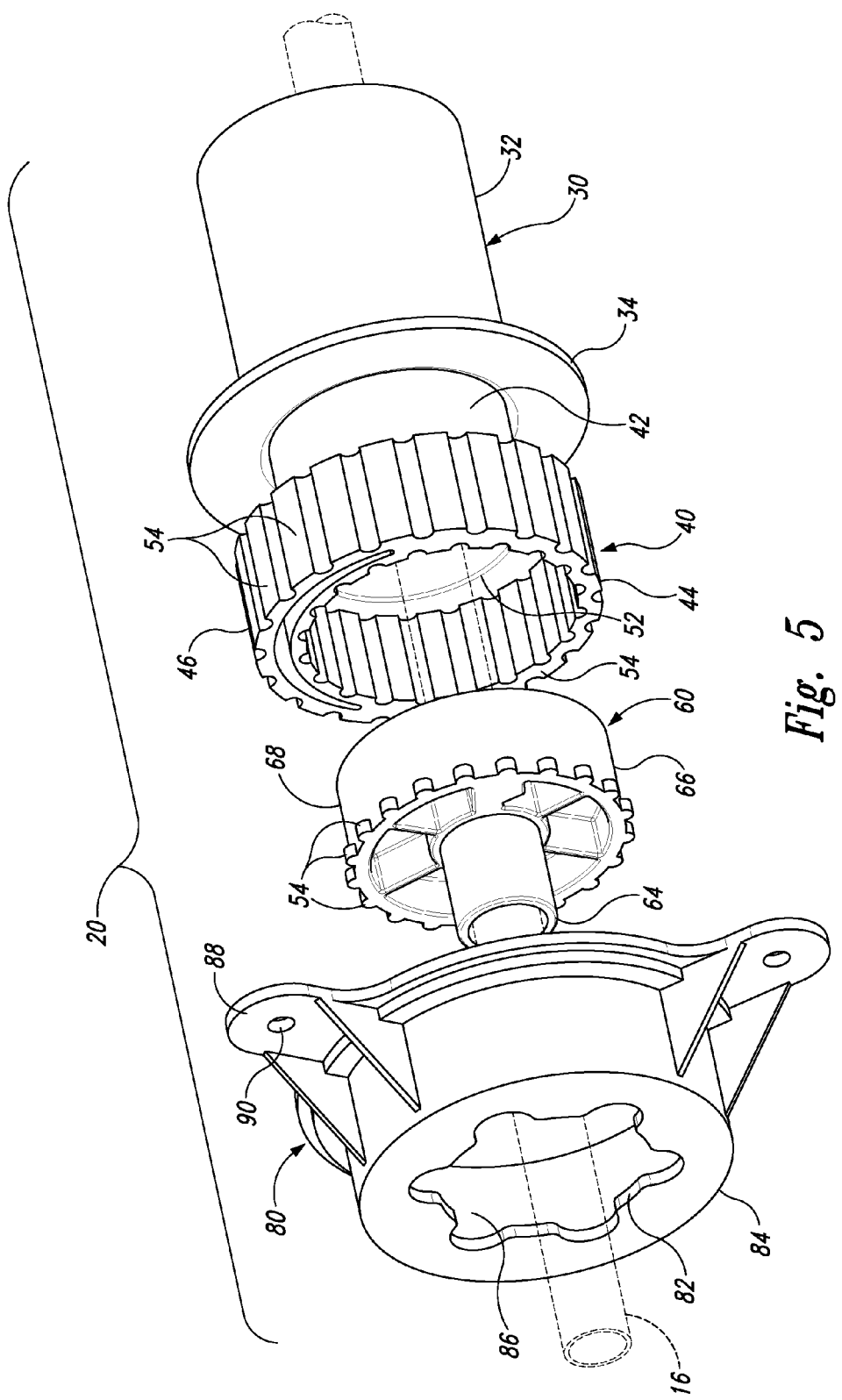
FIG. 5 is a perspective, exploded view of the pass-through mounting assembly of FIG. 4, as seen from a forward perspective.

FIGS. 4-5 show exploded views of an example mounting assembly 20 from a rear perspective (FIG. 4) and a front perspective (FIG. 5). In FIGS. 4-5, the outer sleeve 30, the inner sleeve 40, the bushing component 60, and the cap 80 are ordered and arranged to nest and/or to stack together.

FIGS. 4-5 also illustrate examples of spline members 54 that may be included on interlocking components, at the inner sleeve 40 and cap 80 interface (outer rim 46 and inner rim 86), and at the inner sleeve 40 and bushing 60 interface (inner rim 48 and outer rim 68). Spline members 54 are male and/or female splines and may be referred to as ridges, ribs, teeth, grooves, and/or slots. The interlocking interfaces may be referred to as spline interfaces and/or mating with a spline fit. The interlocking interfaces with spline members 54 are configured to index the relative position of the interlocking components to any one of a plurality of angular positions (rotational arrangements). Thus, when the spline members 54 of the outer rim 46 and the inner rim 86 are engaged, the inner sleeve 40 and the cap 80 are locked in a specific relative angular position. And, when the spline members 54 of the inner rim 48 and the outer rim 68 are engaged, the inner sleeve 40 and the bushing component 60 are locked in a specific relative angular position. While the components are not retained together (e.g., the mounting assembly 20 is not fully assembled and/or the cap 80 is not coupled to the partition 10), the interlocking components may be disengaged, repositioned to another angular position, and then re-engaged. When the components are retained together (e.g., the mounting assembly 20 is fully assembled and/or the cap 80 is coupled to the partition 10), the spline members 54 restrict relative angular displacement (rotational movement) of the corresponding components.

FIG. 6 shows a top view of a partially assembled mounting assembly 20 (without the cap 80) that illustrates an engagement of spline members 54 at the interlocking interface of the inner sleeve 40 and the bushing component 60.

FIGS. 6-7 illustrate an example of bushing component 60 that may include bushing component members 62 and/or one or more axial slits 70. FIG. 6 shows the bushing component 60 as it would be assembled around tube 16 (not shown). FIG. 7 shows the bushing component 60 when disassembled. Though FIG. 7 illustrates the bushing component 60 as two independent bushing component members 62, the bushing component 60 may include a single bushing component member 62 or more than two bushing component members 62. Bushing component members 62 may be coupled together, even when disassembled, e.g., by a tether and/or a hinge. Bushing component members 62 are configured to be assembled together and may include alignment and/or retaining mechanisms such as a key/keyway, tongue-and-groove, latch, and/or snap.

Figure 8:
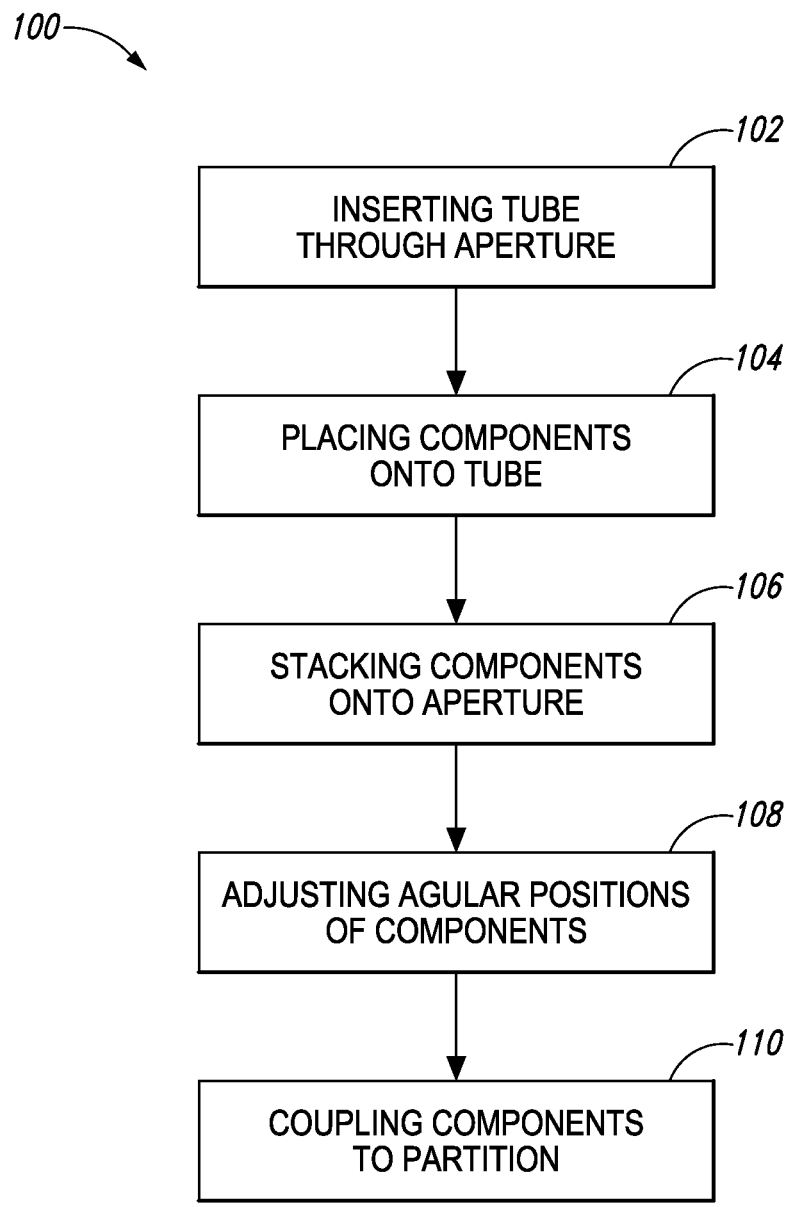
FIG. 8 is a schematic representation of methods according to the present disclosure.

FIG. 8 schematically represents methods 100 of installing mounting assemblies, such as mounting assemblies 20, on a partition with an aperture, such as partition 10 with partition aperture 12. Methods 100 may be methods of retaining a tube, such as tube 16, that passes through the aperture in the partition. Methods 100 may be methods of electrically isolating the tube from the partition. Methods 100 may be methods of reducing spark potential associated with the tube as the tube passes through the aperture in the partition by electrically isolating the tube from the partition by the mounting assembly. Methods 100 generally include inserting 102 the tube through the aperture in the partition, placing 104 components of the mounting assembly onto the tube, stacking 106 the components onto the aperture of the partition, adjusting 108 the angular positions of selected components, and coupling 110 the components of the mounting assembly to the partition. The order of the inserting 102, placing 104, stacking 106, and adjusting 108 may be arranged according the application and/or installation conditions. One or more of these steps may be performed at least partially concurrently. Coupling 110 typically is completed after or concurrent with the completion of the last of the other described steps. Coupling 110 may be performed at least partially concurrently with one or more of the other described steps.

Inserting 102 the tube through the aperture may include threading (axially inserting) the tube through the aperture, guiding the tube through the aperture, and/or radially inserting the tube into the aperture.

Placing 104 components of the mounting assembly onto the tube may include, for each component independently, threading the component onto (axially inserting the component over) the tube, guiding the component onto the tube, radially inserting the tube into the component, and/or assembling the component around the tube. For the actions of radially inserting and assembling, the radial inserting and/or assembling may include opening the component to accept the tube and/or closing the component to retain the tube. The components of the mounting assembly include an outer sleeve, an inner sleeve, a bushing component, and a cap (e.g., outer sleeve 30, inner sleeve 40, bushing component 60, and cap 80). For the bushing component, placing the bushing component onto the tube may include retaining the tube within the bushing component, clamping the tube within the bushing component, and/or contacting the tube within a tube aperture (e.g., tube aperture 28) and/or with a barrel section (e.g., barrel section 64).

Stacking 106 the components of the mounting assembly onto the aperture of the partition may include, for each component independently, nesting, contacting, covering, and/or inserting the component with respect to other components, the partition, and/or the aperture of the partition. For example stacking 106 may include inserting a barrel section of the outer sleeve into the aperture of the partition, nesting a barrel section of the inner sleeve into the barrel section of the outer sleeve, nesting an outer rim of the bushing component into an inner rim of a ring section of the inner sleeve, and/or nesting an inner rim of the cap over an outer rim of the ring section of the inner sleeve.

Adjusting 108 the angular positions of selected components may include adjusting the angular positions of one or more eccentric components (e.g., the inner sleeve 40 and the bushing component 60) and/or mating components (e.g., the outer sleeve 30 and the cap 80) to position the tube aperture of the mounting assembly. Adjusting 108 may include adjusting to align the tube aperture with the tube as the tube passes through the partition and/or to reduce a load on the tube as the tube passes through the partition. Examples of adjusting 108 include changing the relative angular position of the inner sleeve, the bushing component, and the cap to position the tube aperture.

Coupling 110 the components to the partition may include coupling, clamping, fastening, bonding, fusing, welding, and/or adhering one or more of the components together and/or to the partition. For example, coupling 110 may include coupling the cap to the partition when the cap is assembled over the other components (e.g., after the stacking 106). Coupling 110 may interlock the components together and/or into the aperture of the partition. Coupling 110 may include applying sealant, bonding agent, etc. to one or more components to seal and/or to bond the components. Additionally or alternatively, coupling 110 may include coupling two or more components without sealant, bonding agent, etc. Coupling 110 may be performed in a permanent manner (in which the selected components may not be separated without deleterious impact to at least one component) and/or in a non-permanent manner (in which the selected components may be separated without significantly compromising the components).

With respect to FIGS. 1-7, the mounting assembly 20 may be configured for assembly, adjustment, and coupling (together and to the partition 10) from the working side 14 of the partition 10. Methods 100, as illustrated in FIG. 8, may include assembling, adjusting, and coupling the mounting assembly 20 from the working side 14. For example, the outer sleeve 30, the inner sleeve 40, the bushing component 60, and the cap 80 may be placed 104 on the tube 16 and stacked 106 onto the partition aperture 12. The outer sleeve 30, the inner sleeve 40, and the cap 80 may be threaded onto (axially inserted over) the tube 16. Additionally or alternatively, the tube 16 may be radially inserted into the outer sleeve 30, the inner sleeve 40, and/or the cap 80. The bushing component 60 may be threaded onto (axially inserted over) the tube 16 and/or assembled around the tube 16. Additionally or alternatively, the tube 16 may be radially inserted into the tube aperture 28.

Examples of inventive subject matter according to the present disclosure are described in the following enumerated paragraphs.

A1. A pass-through mounting assembly kit comprising:
an outer sleeve with a barrel section and a flange, wherein the barrel section of the outer sleeve is sized to fit through a partition aperture in a partition, wherein the flange is configured to abut a working side of the partition while the barrel section of the outer sleeve extends through the partition aperture;

an inner sleeve with a barrel section and a ring section, wherein the barrel section of the inner sleeve is sized to nest into the barrel section of the outer sleeve, wherein the ring section of the inner sleeve has an outer shoulder that is configured to abut the flange of the outer sleeve, wherein the ring section of the inner sleeve has an outer rim that is concentric with the barrel section of the inner sleeve, wherein the ring section of the inner sleeve has an inner rim that is non-concentric with the barrel section of the inner sleeve, wherein the ring section of the inner sleeve has an inner shoulder;

a bushing component with a barrel section and a ring section, wherein the barrel section of the bushing component defines a tube aperture configured to retain a tube passing through the partition aperture, wherein the tube aperture is non-concentric with the ring section of the bushing component, wherein the ring section of the bushing component has an outer rim that is sized to nest into the inner rim of the inner sleeve, wherein the ring section of the bushing component is sized to abut the inner shoulder of the inner sleeve; and a retaining cap with an inner rim and a top, wherein the inner rim of the retaining cap is sized to nest over the outer rim of the inner sleeve, wherein the top defines a cap aperture sized to permit the tube to pass through at any relative angular position of the retaining cap, the bushing component, and the inner sleeve.

A2. The kit of paragraph A1, wherein the bushing component, the inner sleeve, and the retaining cap are configured to selectively position the tube aperture relative to a primary axis of the mounting assembly.

A3. The kit of any of paragraphs A1-A2, wherein the partition includes a non-metallic material that defines the partition aperture.

A3.1. The kit of paragraph A3, wherein the non-metallic material is a composite material, and optionally wherein the composite material is a carbon fiber reinforced polymer composite.

A4. The kit of any of paragraphs A1-A3.1, wherein the partition is a partition within a fuel system.

A5. The kit of any of paragraphs A1-A4, wherein the partition is a partition within an aircraft wing fuel tank.

A6. The kit of any of paragraphs A1-A5, wherein the tube is at least one of a hydraulic line and a fuel line.

A7. The kit of any of paragraphs A1-A6, wherein the tube is electrically conductive.

A8. The kit of any of paragraphs A1-A7, wherein each of the outer sleeve, the inner sleeve, the bushing component, and the retaining cap are electrically insulating.

A9. The kit of any of paragraphs A1-A8, wherein at least two of the outer sleeve, the inner sleeve, the bushing component, and the retaining cap are formed of different materials.

A10. The kit of any of paragraphs A1-A9, wherein the outer rim of the bushing component is configured to contact the inner rim of the inner sleeve.

A11. The kit of any of paragraphs A1-A10, wherein the inner rim of the retaining cap is configured to contact the outer rim of the inner sleeve.

A12. The kit of any of paragraphs A1-A11, wherein the inner sleeve is at least one of adhered, bonded, coupled, and fastened to the outer sleeve.

A13. The kit of any of paragraphs A1-A12, wherein the inner sleeve is configured to be at least one of adhered, bonded, coupled, and fastened to the outer sleeve.

A14. The kit of any of paragraphs A1-A13, wherein the inner sleeve is at least one of adhered, bonded, coupled, and fastened to the bushing component.

A15. The kit of any of paragraphs A1-A14, wherein the inner sleeve is configured to be at least one of adhered, bonded, coupled, and fastened to the bushing component.

A16. The kit of any of paragraphs A1-A15, wherein the retaining cap is at least one of adhered, bonded, coupled, and fastened to the inner sleeve.

A17. The kit of any of paragraphs A1-A16, wherein the retaining cap is configured to be at least one of adhered, bonded, coupled, and fastened to the inner sleeve.

A18. The kit of any of paragraphs A1-A17, wherein the retaining cap is configured to be at least one of adhered, bonded, coupled, and fastened to the partition, optionally to the working side of the partition.

A19. The kit of any of paragraphs A1-A18, wherein the retaining cap is configured to retain at least one of the bushing component, the inner sleeve, and the outer sleeve against the working side of the partition.

A20. The kit of any of paragraphs A1-A19, wherein the outer sleeve is configured to space the inner sleeve away from the partition.

A21. The kit of any of paragraphs A1-A20, wherein the inner sleeve is configured to be spaced away from the tube, optionally by the bushing component.

A22. The kit of any of paragraphs A1-A21, wherein the bushing component is configured to contact the tube.

A23. The kit of any of paragraphs A1-A22, wherein the retaining cap is configured to be spaced away from the tube, optionally by the bushing component.

A24. The kit of any of paragraphs A1-A23, wherein the inner sleeve and the retaining cap are configured to interlock in any one of a plurality of angular positions.

A25. The kit of any of paragraphs A1-A24, wherein the outer rim of the inner sleeve includes spline members and the inner rim of the retaining cap includes spline members, and wherein the spline members of the outer rim of the inner sleeve are configured to mate with the spline members of the inner rim of the retaining cap in any one of a plurality of angular positions.

A26. The kit of any of paragraphs A1-A25, wherein the inner sleeve and the bushing component are configured to interlock in any one of a plurality of angular positions.

A27. The kit of any of paragraphs A1-A26, wherein the inner rim of the inner sleeve includes spline members and the outer rim of the bushing component includes spline members, and wherein the spline members of the inner rim of the inner sleeve are configured to mate with the spline members of the outer rim of the bushing component in any one of a plurality of angular positions.

A28. The kit of any of paragraphs A1-A27, wherein the bushing component is configured to clamp the tube within the tube aperture.

A29. The kit of any of paragraphs A1-A28, wherein the bushing component is configured to radially restrain the tube within the tube aperture.

A30. The kit of any of paragraphs A1-A29, wherein the bushing component is configured to permit axial movement of the tube within the tube aperture.

A31. The kit of any of paragraphs A1-A30, wherein the bushing component is configured to radially insert the tube into the tube aperture.

A32. The kit of any of paragraphs A1-A31, wherein the bushing component defines an axial slot that is configured to radially insert the tube into the tube aperture.

A33. The kit of any of paragraphs A1-A32, wherein the bushing component includes one or more bushing component members that are configured to separate to accept the tube, optionally at least one of radially and axially, and that are configured to couple together to retain the tube within the tube aperture.

A34. The kit of any of paragraphs A1-A33, wherein the bushing component includes at least one of plastic, polymer, polyamide, fluoropolymer, polyurethane, polyester, polyacrylic, polycarbonate, polyether ether ketone, epoxy, glass, and ceramic.

A35. The kit of any of paragraphs A1-A34, wherein the barrel section of the inner sleeve is sized to permit the tube to pass through at any relative angular position of the retaining cap, the bushing component, and the inner sleeve.

A36. The kit of any of paragraphs A1-A35, wherein the inner sleeve is configured to axially insert the tube, optionally wherein the tube includes a tube fitting.

A37. The kit of any of paragraphs A1-A36, wherein the inner sleeve includes at least one of plastic, polymer, polyamide, fluoropolymer, polyurethane, polyester, polyacrylic, polycarbonate, polyether ether ketone, epoxy, glass, and ceramic, and optionally wherein the inner sleeve includes a composite material.

A38. The kit of any of paragraphs A1-A37, wherein the outer sleeve is configured to axially insert the tube, optionally wherein the tube includes a tube fitting.

A39. The kit of any of paragraphs A1-A38, wherein the outer sleeve includes at least one of plastic, polymer, polyamide, fluoropolymer, polyurethane, polyester, polyacrylic, polycarbonate, polyether ether ketone, epoxy, glass, and ceramic, and optionally wherein the outer sleeve includes a composite material.

A40. The kit of any of paragraphs A1-A39, wherein the outer rim of the inner sleeve has an effective diameter that is less than an effective diameter of the flange.

A41. The kit of any of paragraphs A1-A40, wherein the retaining cap is configured to axially insert the tube, optionally wherein the tube includes a tube fitting.

A42. The kit of any of paragraphs A1-A41, wherein the retaining cap includes at least one of plastic, polymer, polyamide, fluoropolymer, polyurethane, polyester, polyacrylic, polycarbonate, polyether ether ketone, epoxy, glass, and ceramic, and optionally wherein the retaining cap includes a composite material.

B1. A pass-through mounting assembly comprising:
an outer sleeve with a barrel section and a flange, wherein the barrel section of the outer sleeve is configured to extend through a partition aperture in a partition, wherein the flange is configured to abut a working side of the partition while the barrel section of the outer sleeve extends through the partition aperture;
an inner sleeve with a barrel section and a ring section, wherein the barrel section of the inner sleeve is nested into the barrel section of the outer sleeve, wherein the ring section of the inner sleeve has an outer shoulder that abuts the flange of the outer sleeve, wherein the ring section of the inner sleeve has an outer rim that is concentric with the barrel section of the inner sleeve, wherein the ring section of the inner sleeve has an inner rim that is non-concentric with the barrel section of the inner sleeve, wherein the ring section of the inner sleeve has an inner shoulder;
a bushing component with a barrel section and a ring section, wherein the barrel section of the bushing component defines a tube aperture configured to retain a tube passing through the partition aperture, wherein the tube aperture is non-concentric with the ring section of the bushing component, wherein the ring section of the bushing component has an outer rim that is nested into the inner rim of the inner sleeve, wherein the ring section of the bushing component abuts the inner shoulder of the inner sleeve; and a retaining cap with an inner rim and a top, wherein the inner rim of the retaining cap is nested over the outer rim of the inner sleeve, wherein the top defines a cap aperture sized to permit the tube to pass through at any relative angular position of the retaining cap, the bushing component, and the inner sleeve.

B2. The mounting assembly of paragraph B1, wherein the bushing component, the inner sleeve, and the retaining cap are configured to selectively position the tube aperture relative to a primary axis of the mounting assembly.

B3. The mounting assembly of any of paragraphs B1-B2, wherein the partition includes a non-metallic material that defines the partition aperture.

B3.1. The mounting assembly of paragraph B3, wherein the non-metallic material is a composite material, and optionally wherein the composite material is a carbon fiber reinforced polymer composite.

B4. The mounting assembly of any of paragraphs B1-B3.1, wherein the partition is a partition within a fuel system.

B5. The mounting assembly of any of paragraphs B1-B4, wherein the partition is a partition within an aircraft wing fuel tank.

B6. The mounting assembly of any of paragraphs B1-B5, wherein the tube is at least one of a hydraulic line and a fuel line.

B7. The mounting assembly of any of paragraphs B1-B6, wherein the tube is electrically conductive.

B8. The mounting assembly of any of paragraphs B1-B7, wherein each of the outer sleeve, the inner sleeve, the bushing component, and the retaining cap are electrically insulating.

B9. The mounting assembly of any of paragraphs B1-B8, wherein at least two of the outer sleeve, the inner sleeve, the bushing component, and the retaining cap are formed of different materials.

B10. The mounting assembly of any of paragraphs B1-B9, wherein the outer rim of the bushing component contacts the inner rim of the inner sleeve.

B11. The mounting assembly of any of paragraphs B1-B10, wherein the inner rim of the retaining cap contacts the outer rim of the inner sleeve.

B12. The mounting assembly of any of paragraphs B1-B11, wherein the outer sleeve is at least one of adhered, bonded, coupled, and fastened to the partition, optionally to the working side of the partition.

B13. The mounting assembly of any of paragraphs B1-B12, wherein the inner sleeve is at least one of adhered, bonded, coupled, and fastened to the outer sleeve.

B14. The mounting assembly of any of paragraphs B1-B13, wherein the inner sleeve is at least one of adhered, bonded, coupled, and fastened to the bushing component.

B15. The mounting assembly of any of paragraphs B1-B14, wherein the retaining cap is at least one of adhered, bonded, coupled, and fastened to the inner sleeve.

B16. The mounting assembly of any of paragraphs B1-B15, wherein the retaining cap is at least one of adhered, bonded, coupled, and fastened to the partition, optionally to the working side of the partition.

B17. The mounting assembly of any of paragraphs B1-B16, wherein the retaining cap retains at least one of the bushing component, the inner sleeve, and the outer sleeve against the working side of the partition.

B18. The mounting assembly of any of paragraphs B1-B17, wherein the inner sleeve is spaced away from the partition by the outer sleeve.

B19. The mounting assembly of any of paragraphs B1-B18, wherein the inner sleeve is spaced away from the tube, optionally by the bushing component.

B20. The mounting assembly of any of paragraphs B1-B19, wherein the bushing component contacts the tube.

B21. The mounting assembly of any of paragraphs B1-B20, wherein the retaining cap is spaced away from the tube, optionally by the bushing component.

B22. The mounting assembly of any of paragraphs B1-B21, wherein the inner sleeve and the retaining cap are configured to interlock in any one of a plurality of angular positions.

B23. The mounting assembly of any of paragraphs B1-B22, wherein the outer rim of the inner sleeve includes spline members and the inner rim of the retaining cap includes spline members, and wherein the spline members of the outer rim of the inner sleeve are configured to mate with the spline members of the inner rim of the retaining cap in any one of a plurality of angular positions.

B24. The mounting assembly of any of paragraphs B1-B23, wherein the inner sleeve and the bushing component are configured to interlock in any one of a plurality of angular positions.

B25. The mounting assembly of any of paragraphs B1-B24, wherein the inner rim of the inner sleeve includes spline members and the outer rim of the bushing component includes spline members, and wherein the spline members of the inner rim of the inner sleeve are configured to mate with the spline members of the outer rim of the bushing component in any one of a plurality of angular positions.

B26. The mounting assembly of any of paragraphs B1-B25, wherein the bushing component clamps the tube within the tube aperture.

B27. The mounting assembly of any of paragraphs B1-B26, wherein the bushing component radially restrains the tube within the tube aperture.

B28. The mounting assembly of any of paragraphs B1-B27, wherein the bushing component is configured to permit axial movement of the tube within the tube aperture.

B29. The mounting assembly of any of paragraphs B1-B28, wherein the bushing component is configured to radially insert the tube into the tube aperture.

B30. The mounting assembly of any of paragraphs B1-B29, wherein the bushing component defines an axial slit that is configured to radially insert the tube into the tube aperture.

B31. The mounting assembly of any of paragraphs B1-B30, wherein the bushing component includes one or more bushing component members that are configured to separate to accept the tube, optionally at least one of radially and axially, and that are configured to couple together to retain the tube within the tube aperture.

B32. The mounting assembly of any of paragraphs B1-B31, wherein the bushing component includes at least one of plastic, polymer, polyamide, fluoropolymer, polyurethane, polyester, polyacrylic, polycarbonate, polyether ether ketone, epoxy, glass, and ceramic.

B33. The mounting assembly of any of paragraphs B1-B32, wherein the barrel section of the inner sleeve is sized to permit the tube to pass through at any relative angular position of the retaining cap, the bushing component, and the inner sleeve.

B34. The mounting assembly of any of paragraphs B1-B33, wherein the inner sleeve is configured to axially insert the tube, optionally wherein the tube includes a tube fitting.

B35. The mounting assembly of any of paragraphs B1-B34, wherein the outer shoulder of the inner sleeve has an effective diameter that is less than an effective diameter of the flange of the outer sleeve.

B36. The mounting assembly of any of paragraphs B1-B35, wherein the inner sleeve includes at least one of plastic, polymer, polyamide, fluoropolymer, polyurethane, polyester, polyacrylic, polycarbonate, polyether ether ketone, epoxy, glass, and ceramic, and optionally wherein the inner sleeve includes a composite material.

B37. The mounting assembly of any of paragraphs B1-B36, wherein the outer sleeve is configured to axially insert the tube, optionally wherein the tube includes a tube fitting.

B38. The mounting assembly of any of paragraphs B1-B37, wherein the outer sleeve includes at least one of plastic, polymer, polyamide, fluoropolymer, polyurethane, polyester, polyacrylic, polycarbonate, polyether ether ketone, epoxy, glass, and ceramic, and optionally wherein the outer sleeve includes a composite material.

B39. The mounting assembly of any of paragraphs B1-B38, wherein the retaining cap is configured to axially insert the tube, optionally wherein the tube includes a tube fitting.

B40. The mounting assembly of any of paragraphs B1-B39, wherein the retaining cap includes at least one of plastic, polymer, polyamide, fluoropolymer, polyurethane, polyester, polyacrylic, polycarbonate, polyether ether ketone, epoxy, glass, and ceramic, and optionally wherein the retaining cap includes a composite material.

C1. A method of retaining an electrically conductive tube passing through a partition aperture in a non-metallic partition, the method comprising:

inserting the tube through the aperture;

threading an outer sleeve, an inner sleeve, and a retaining cap onto the tube on a working side of the partition, wherein the outer sleeve has a barrel section and a flange, wherein the inner sleeve has a barrel section and a ring section with an outer rim and an inner rim, wherein the retaining cap has an inner rim and a top, wherein the outer rim of the ring section of the inner sleeve is concentric with the barrel section of the inner sleeve, wherein the inner rim of the ring section of the inner sleeve is non-concentric with the outer rim of the ring section of the inner sleeve;

placing a bushing component onto the tube, wherein the bushing component has a barrel section and a ring section with an outer rim, wherein the barrel section of the bushing component defines a tube aperture that is non-concentric with the outer rim of the ring section of the bushing component;

inserting the barrel section of the outer sleeve into the partition aperture;

nesting the barrel section of the inner sleeve into the barrel section of the outer sleeve;

nesting the outer rim of the bushing component into the inner rim of the ring section of the inner sleeve;

nesting the inner rim of the retaining cap over the outer rim of the ring section of the inner sleeve;

adjusting the relative angular position of the bushing component, the inner sleeve, and the retaining cap to align the tube aperture with the tube as the tube passes through the partition; and coupling the retaining cap to the partition to lock the relative angular position of the bushing component, the inner sleeve, and the retaining cap.

C2. The method of paragraph C1, wherein the mounting assembly is the mounting assembly of any of paragraphs A1-A42.

C3. The method of any of paragraphs C1-C2, wherein the threading the tube through the aperture includes guiding the tube through the aperture.

C4. The method of any of paragraphs C1-C3, wherein the threading the outer sleeve, the inner sleeve, and the retaining cap onto the tube includes at least one of guiding the outer sleeve onto the tube, guiding the inner sleeve onto the tube, and guiding the retaining cap onto the tube.

C5. The method of any of paragraphs C1-C4, wherein the placing the bushing component onto the tube includes at least one of retaining the tube within the bushing component, clamping the tube within the bushing component, and contacting the tube with the barrel section of the bushing component.

C6. The method of any of paragraphs C1-05, wherein the placing the bushing component onto the tube includes assembling the bushing component around the tube.

C7. The method of any of paragraphs C1-C6, wherein the placing the bushing component onto the tube includes threading the bushing component onto the tube.

C8. The method of any of paragraphs C1-C7, wherein the placing the bushing component onto the tube includes radially inserting the tube into the bushing component.

C8.1. The method of paragraph C8, wherein the radially inserting includes opening the bushing component to accept the tube.

C8.2. The method of any of paragraphs C8-C8.1, wherein the radially inserting includes closing the bushing component to retain the tube.

C9. The method of any of paragraphs C1-C8.2, wherein the inserting the barrel section of the outer sleeve into the aperture includes contacting the working side of the partition with the flange of the outer sleeve.

C10. The method of any of paragraphs C1-C9, wherein the nesting the barrel section of the inner sleeve into the barrel section of the outer sleeve includes contacting the flange of the outer sleeve with an outer shoulder of the ring section of the inner sleeve.

C11. The method of any of paragraphs C1-C10, wherein the adjusting includes adjusting the relative angular position of the bushing component, the inner sleeve, and the retaining cap to reduce a load on the tube as it passes through the tube aperture.

C12. The method of any of paragraphs C1-C11, wherein the method is a method of reducing spark potential associated with an electrically conductive tube passing through an aperture in a non-metallic partition by electrically isolating the tube from the partition with a mounting assembly.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and apparatuses, and steps of methods disclosed herein are not required of all systems, apparatuses and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

The invention claimed is:

1. A kit for assembling a pass-through mounting assembly, the kit comprising:
   an outer sleeve with a barrel section and a flange, wherein the barrel section of the outer sleeve is sized to fit through a partition aperture in a partition, wherein the flange is configured to abut a working side of the partition while the barrel section of the outer sleeve is configured to extend through the partition aperture;
   an inner sleeve with a barrel section and a ring section, wherein the barrel section of the inner sleeve is sized to nest into the barrel section of the outer sleeve to be in direct contact with the barrel section of the outer sleeve wherein the ring section of the inner sleeve has an outer shoulder that is configured to abut the flange of the outer sleeve, wherein the ring section of the inner sleeve has an outer rim that is concentric with the barrel section of the inner sleeve, wherein the ring section of the inner sleeve has an inner rim that is non-concentric with the barrel section of the inner sleeve, wherein the ring section of the inner sleeve has an inner shoulder;
   a bushing component with a barrel section and a ring section, wherein the barrel section of the bushing component defines a tube aperture configured to retain a tube passing through the partition aperture, wherein the tube aperture is non-concentric with the ring section of the bushing component, wherein the ring section of the bushing component has an outer rim that is sized to nest into the inner rim of the inner sleeve to be in direct contact with the inner rim of the inner sleeve wherein the ring section of the bushing component is sized to abut the inner shoulder of the inner sleeve; and
   a retaining cap with an inner rim and a top, wherein the inner rim of the retaining cap is sized to nest over the outer rim of the inner sleeve to be in direct contact with the outer rim of the inner sleeve wherein the top defines a cap aperture sized to permit the tube to pass through at any relative angular position of the retaining cap, the bushing component, and the inner sleeve.

2. The kit of claim 1, wherein the bushing component, the inner sleeve, and the retaining cap are configured to selectively position the tube aperture relative to a primary axis of the pass-through mounting assembly when assembled from the kit.

3. The kit of claim 1, wherein each of the outer sleeve, the inner sleeve, the bushing component, and the retaining cap is electrically insulating.

4. The kit of claim 1, wherein at least two of the outer sleeve, the inner sleeve, the bushing component, and the retaining cap are formed of different materials.

5. The kit of claim 1, wherein the retaining cap is configured to retain at least one of the bushing component, the inner sleeve, and the outer sleeve against the working side of the partition.

6. The kit of claim 1, wherein the outer sleeve is configured to space the inner sleeve away from the partition.

7. The kit of claim 1, wherein the inner sleeve is configured to be spaced away from the tube by the bushing component.

8. The kit of claim 1, wherein the retaining cap is configured to be spaced away from the tube by the bushing component.

9. The kit of claim 1, wherein the inner sleeve and the retaining cap are configured to interlock in any one of a plurality of discrete angular positions.

10. The kit of claim 1, wherein the inner sleeve and the bushing component are configured to interlock in any one of a plurality of discrete angular positions.

11. The kit of claim 1, wherein the bushing component is configured to permit axial movement of the tube within the tube aperture.

12. The kit of claim 1, wherein the bushing component includes bushing component members that are configured to separate to accept the tube and that are configured to couple together to retain the tube within the tube aperture.

13. A pass-through mounting assembly comprising:
   an outer sleeve with a barrel section and a flange, wherein the barrel section of the outer sleeve is configured to extend through a partition aperture in a partition, wherein the flange is configured to abut a working side of the partition while the barrel section of the outer sleeve is configured to extend through the partition aperture;

an inner sleeve with a barrel section and a ring section, wherein the barrel section of the inner sleeve is nested into the barrel section of the outer sleeve and directly contacts the barrel section of the outer sleeve wherein the ring section of the inner sleeve has an outer shoulder that abuts the flange of the outer sleeve, wherein the ring section of the inner sleeve has an outer rim that is concentric with the barrel section of the inner sleeve, wherein the ring section of the inner sleeve has an inner rim that is non-concentric with the barrel section of the inner sleeve, wherein the ring section of the inner sleeve has an inner shoulder;

a bushing component with a barrel section and a ring section, wherein the barrel section of the bushing component defines a tube aperture configured to retain an electrically conductive tube passing through the partition aperture, wherein the tube aperture is non-concentric with the ring section of the bushing component, wherein the ring section of the bushing component has an outer rim, wherein the outer rim of the ring section of the bushing component is nested into the inner rim of the inner sleeve and directly contacts the inner rim of the inner sleeve, wherein the ring section of the bushing component abuts the inner shoulder of the inner sleeve; and a retaining cap with an inner rim and a top, wherein the inner rim of the retaining cap is nested over the outer rim of the inner sleeve and directly contacts the outer rim of the inner sleeve wherein the top defines a cap aperture sized to permit the electrically conductive tube to pass through at any relative angular position of the retaining cap, the bushing component, and the inner sleeve.

14. The pass-through mounting assembly of claim 13, wherein each of the outer sleeve, the inner sleeve, the bushing component, and the retaining cap is electrically insulating.

15. The pass-through mounting assembly of claim 13, wherein at least two of the outer sleeve, the inner sleeve, the bushing component, and the retaining cap are formed of different materials.

16. The pass-through mounting assembly of claim 13, wherein the outer rim of the inner sleeve includes spline members spaced radially about the outer rim and the inner rim of the retaining cap includes spline members spaced radially about the inner rim, and wherein the spline members of the outer rim of the inner sleeve are configured to mate with the spline members of the inner rim of the retaining cap in any one of a plurality of discrete angular positions.

17. The pass-through mounting assembly of claim 13, wherein the inner rim of the inner sleeve includes spline members and the outer rim of the bushing component includes spline members, and wherein the spline members of the inner rim of the inner sleeve are configured to mate with the spline members of the outer rim of the bushing component in any one of a plurality of angular positions.

* * * * *